INVENTOR.
JOSEPH W. KING

INVENTOR.
JOSEPH W. KING
BY Bosworth, Sessions,
Herrstrom & Knowles
ATTORNEYS

United States Patent Office 3,275,975
Patented Sept. 27, 1966

1

3,275,975
ULTRASONIC DETECTING MEANS
Joseph W. King, Lakewood, Ohio, assignor to Cleveland Technical Center, Inc., Cleveland, Ohio, a corporation of Delaware
Filed Dec. 21, 1964, Ser. No. 419,758
12 Claims. (Cl. 340—1)

This invention relates to a system for detecting the non-movement of a body within a predetermined time period and more particularly to an ultrasonic system adapted to render an alarm if no movement takes place within a predetermined time and within a predetermined ultrasonic beam.

Heretofore, various systems have been employed to detect the presence of bodies within a predetermined area. These systems are generally employed as burglar alarms and utilize an absorption principle in which a body in the area absorbs a predetermined amount of energy with the result that the energy received by a receiver coupled to the predetermined area falls below the required level and actuates an alarm. It is known in the art to employ ultrasonic beams of energy and to detect the Doppler frequency or the change in frequency of the energy reflected by a body moving in the beam. It is also known in the art to provide an ultrasonic alarm system for a swimming pool in which the absorption principle is employed. In this system a transmitting transducer and a receiving transducer are provided, and the presence of a body in the bottom of the pool will be indicated by a change in level of the received energy; this system is provided with a delay network which delivers an alarm only after a body has remained within the transmission region for a predetermined minimum of interval of time. The above mentioned systems, however, are incapable of detecting the absence of motion of a Doppler signal creating body within a predetermined beam of energy, such as ultrasonic energy, if the body normally remains within the transmission path.

Accordingly, it is an object of this invention to provide a system for detecting the absence of movement of an ultrasonic reflecting body within a variable predetermined time interval while the body remains in the transmission path of a beam of ultrasonic energy.

Another object of this invention is to provide a non-movement alarm system which can be quickly and easily converted to a burglar alarm system for detecting the movement of a body within the energy beam.

Still another object of this invention is to provide a system in which a beam of ultrasonic energy is directed from a transducer and Doppler signal receiving means are provided for detecting non-movement of an ultrasonic energy reflecting member and indicating an alarm condition if such non-movement persists for a predetermined period.

It is still another object of this invention to provide an ultrasonic alarm system for detecting the non-movement of an object within an ultrasonic beam within a predetermined time interval.

Yet another object of this invention is to provide a vehicle brake control system with an actuating system responsive to the non-movement of the vehicle operator within a predetermined period.

Briefly, this invention comprises a system for detecting absence of movement of an object within a beam of energy and within a predetermined time interval which includes an ultrasonic transmitter for transmitting a beam of energy, an ultrasonic Doppler signal receiver including a transducer for receiving energy reflected from the body, a Doppler signal detector coupled to the receiving transducer, and alarm means for indicating the failure of said receiver to receive a Doppler signal from

2 the body within a predetermined time interval. The system also includes a resettable time-out means connected between the receiver and the alarm means which resettable time-out means is reset each time a Doppler signal is received. The time-out means includes means for actuating the alarm when no Doppler signal is received within the predetermined time interval.

In accordance with other aspects of the invention, the alarm means includes a visual alarm means connected to a time-out means and the time-out means includes means for actuating the visual alarm means a predetermined period after no Doppler signal is received.

In accordance with further aspects of the invention, the system is employed to detect non-movement of the operator of a vehicle in which the operator must remain at his station and in which the system comprises vehicle brake control means coupled to the time-out means to be actuated at a predetermined time after the alarm means.

Preferably, the system includes an ultrasonic transmitter which directs a beam at the vehicle operator and a receiving transducer which receives Doppler reflected energy from the motion of the operator, detects the Doppler signal and resets the time-out means each time a Doppler signal is received. If the operator does not move sufficiently to cause a Doppler signal within a predetermined period, which period is determined by the time-out means, then the time-out means actuates the alarm means. Preferably, however, the time-out means actuates a visual or audible alarm to alert the operator. If the operator is conscious, he moves to cause a Doppler signal to reset the time-out means. If, however, the operator is unconscious and does not move in response to the visual alarm, then the time-out means actuates the audible alarm and subsequently actuates the brake control means.

Other objects and advantages relate to certain novel features of construction and combinations and arrangements of parts which provide economy in manufacture, installation, maintenance and operation. The invention is described in connection with the accompanying drawing, forming a part of the specification and illustrating the preferred embodiment which represents the best known mode of practicing the invention.

Figure 1:
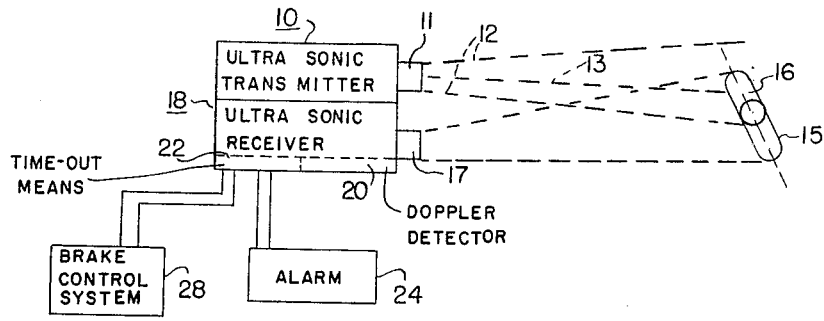
FIG. 1 is a combination block, pictorial and schematic diagram of one illustrative embodiment of this invention.

Referring now to the drawing in which FIG. 1 depicts one illustrative embodiment of this invention and including an ultrasonic transmitter 10 having an ultrasonic transducer 11 connected to the transmitter and forming a part thereof for producing a beam of energy as indicated by the dashed line 12. In this particular instance, the beam 12 is directed with its axis 13 forming an obtuse angle with the major cross-sectional dimension of a Doppler signal producing object which, for the purposes of this explanation, is a vehicle operator 15 positioned in the operator's seat, or operator's station. In this particular embodiment, the axis 13 of the beam 12 is directed at an angle in the range of 100° to 135° relative to the major cross-sectional dimension 16 of the operator. Preferably, an angle of 120° is employed. Operator movement along the dimension 16 as well as movement perpendicular to this dimension and along lines intermediate these lines will produce Doppler signals from the beam 12. The absence of Doppler signals, within a predetermined period, is employed to indicate a potentially dangerous absence of movement on the part of the operator 15. Sonic energy reflected from the operator 15 is received by a receiving transducer 17 which is a portion of a ultrasonic receiver 18. The ultrasonic receiver 18 includes a Doppler detector 20 coupled to the transducer 17 and includes a time-out device 22 coupled to the output of the Doppler detector 20 to be reset by the output of Doppler signals from the Doppler detector. In the absence of these resetting signals, within a predetermined time-out period, the time-out device 22 is actuated. An alarm indicates that the vehicle operator has not moved sufficiently to produce a Doppler signal within a predetermined period, which predetermined period is preferably determined by a variable manual control on the time-out device. For example, this predetermined period may be set at ten seconds or twenty seconds depending on the particular requirement of motion on the part of the operator. If the operator is conscious he will note the visual or audible alarm and will move sufficiently to produce a Doppler signal which will turn off the alarm.

The magnitude of movement required to reset the time-out device is determined by a number of factors. For example, the frequency of the Doppler signal is proportional to the transmitted frequency and to the rate of movement of the reflecting body. In this particular instance, it is preferred to have the system give a warning and actuate the brake system if the operator movement is less than 2″ relative to the beam axis. Preferably, the time-out device is reset by a movement of more than 2″ if the rate of this movement is at least 5′ per second. With a transmitter frequency of 38 to 42 kc., movement at the rate of five feet per second will produce a Doppler frequency of the order of 170 cycles per second. If the operator fails to respond to the alarm by manually resetting it and no Doppler signal is produced for a second predetermined interval of time, the time-out device actuates a brake control system 28 which actuates the vehicle brakes. The details of the operation of the time-out device and the resetting operation, as well as the actuation of the alarms and the brake control system, will be subsequently described in detail.

Figure 2:
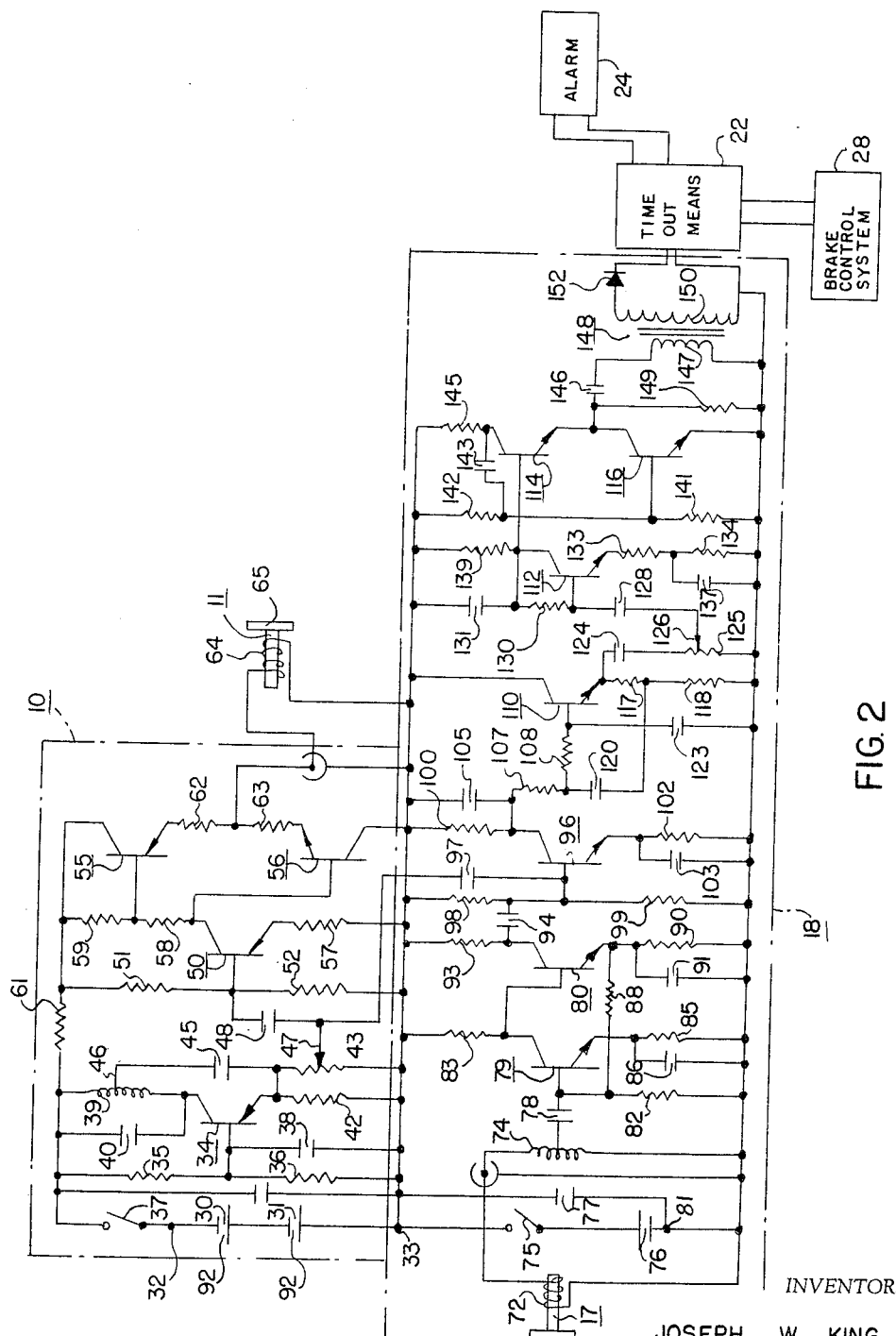
FIG. 2 is a combined block and schematic diagram of one illustrative embodiment according to FIG. 1.

FIG. 2 is a combined schematic and block diagram of an ultrasonic transmitter receiver including Doppler detector with alarm systems which may be employed in the embodiment of FIG. 1. The transmitter 10 is enclosed in a dashed-line box. The transmitter includes a number of solid-state devices which are energized by a pair of serially connected batteries 30, 31 which in this particular instance may be 9-volt dry cells and having negative and positive terminals 32, 33, respectively. A transistor 34, for generating ultrasonic signals, has its base connected to a voltage divider including resistors 35, 36 which are connected across the batteries 30, 31 by a switch 37. The base of transistor 34 is also connected to battery terminal 33 through a suitable capacitor 38. The collector of transistor 34 is connected to a resonant circuit including an inductance 39 and a capacitor 40. The emitter of transistor 34 is connected to terminal 33 by a parallel resistor combination including a fixed resistor 42 and a variable resistor 43. The emitter of transistor 34 is also connected through a capacitor 45 to a tap 46 on the inductance 39. The capacitor 45 provides feedback between the emitter and collector electrodes causing the transistor 34 to oscillate. Preferably, this oscillation is in the ultrasonic range, which for example may be of the range of 38 to 42 kilocycles.

The generated alternating current is fed from the variable tap 47 through a caapcitor 48 to the base of a transistor 50. The base of transistor 50 is connected to a voltage divider including a resistor 51, a resistor 52 serially connected between the batteries 30, 31. The transistor 50 acts as a linear amplifier for the generated alternating current to drive a pair of power output transistors 55, 56. The emitter of transistor 50 is connected to battery terminal 33 through a suitable emitter biasing resistor 57 and the collector electrode of transistor 50 is connected through serially connected resistors 58, 59 and 61 to battery switch 37. The latter section of the transmitter including transistors 50, 55 and 56 is connected to the batteries 30, 31 through decoupling resistor 61. The transistors 55, 56 are connected as complementary emitter followers with the emitters connected through individual resistors 62, 63 to a coil 64 of the transmitting transducer 11. The coil 64 is magnetically coupled to a movable diaphragm 65. When coil 64 is energized, it generates a beam of ultrasonic energy in a manner well known in the art. By utilizing this transmitter and transducer, which are very compact in construction and economical to assemble, a beam of ultrasonic energy may be directed towards a body or any ultrasonic sound reflecting member, the non-movement of which is to be detected. This system can be utilized in connection with any object or member, the movement of which produces a Doppler signal from the beam of ultrasonic energy radiated from the diaphragm 65.

The receiver 18 includes ultrasonic transducer 17 which comprises a movable diaphragm 70 magnetically coupled to a coil 72. The coil 72 is connected across a coil 74 and the received ultrasonic energy is delivered from transducer 17 to coil 74. The receiver includes a start switch, or energizing switch 75, connected between a battery 76 and terminal 33. A capacitor 77 is connected in parallel with the battery 76 and the switch 75 to reduce the arcing as switch 75 is closed and to bypass ultrasonic energy around the battery 76 after switch 75 is closed. The ultrasonic energy delivered to the coil 74 passes through a capacitor 78 to the base of a transistor amplifier 79, the output of which is fed through a second transistor amplifier 80. The transistor 79 has its base connected to terminal 81 of battery 76 through a resistor 82 and has its collector connected to terminal 33 through a resistor 83. The emitter of transistor 79 is connected to battery terminal 81 through a parallel resistor-capacitor network including resistor 85 and capacitor 86. The emitter of transistor 80 is connected to the base of transistor 79 through a suitable resistor 88. The emitter of transistor 80 is also connected to the battery terminal 81 through a parallel resistor-capacitor network including resistor 90 and capacitor 91. The collector of transistor 80 is connected to battery terminal 33 through a resistor 93. The output of transistor 80 is an amplified ultrasonic signal, the frequency of which varies with operator movement and is fed through a capacitor 94 to the base of a mixer transistor 96. The base of the mixer transistor 96 is also connected by means of a capacitor 97 to the variable tap 47 of resistor 43 in the signal generator circuit of transmitter 10. Transistor 96 receives a signal from the transmitter for the purpose of beating against the reflected signal received through the receiving transducer 17 and thus provide sum and difference frequencies from the combination of these two signals. This arrangement eliminates the need for a local oscillator in the receiver and automatically compensates for transmitter frequency changes. The base of the transistor 96 is connected to a voltage divider including a resistor 98 and a resistor 99 connected between battery terminals 33, 81. The collector of transistor 96 is connected to terminal 33 through a suitable resistor 100 and the emitter is connected to terminal 81 through a resistor-capacitor combination including resistor 102 and capacitor 103.

The "sum" frequencies of the output of mixer transistor 96 are bypassed through a suitable capacitor 105 and the difference frequencies, or the Doppler frequency signals, are fed through a pair of serially connected resistors 107, 108 to the base of a transistor 110. The difference frequencies lie within the normal audio range and are amplified to control a suitable alarm means. This amplification is produced by transistor 110, a subsequent transistor 112 and a pair of power output transistors 114, 116. Transistor 110 has its emitter connected to battery terminal 81 through a series combination of resistors including a resistor 117 and a resistor 118, the intermediate point of which is connected through a capacitor 120 to the point intermediate resistor 107 and resistor 108 in the base circuit of transistor 110. The collector of transistor 110 is connected directly to terminal 33 and the base of the transistor 110 is also connected to battery terminal 81 by means of a capacitor 123.

The output of the transistor 110 is fed from the emitter through a capacitor 124 and a variable resistor 125, the variable tap 126 of which is connected through a suitable capacitor 128 to the base of transistor 112. A serially connected resistor and capacitor network including a resistor 130 and a capacitor 131 are connected between the base of the transistor 112 and battery terminal 33. The emitter electrode of transistor 112 is connected through a pair of serially connected resistors 133, 134 to battery terminal 81 and a capacitor 137 is connected across the resistor 134. The collector of transistor 112 is connected through a suitable resistor 139 to terminal 33. The base of transistor 114 is connected intermediate resistor 130 and capacitor 131. The base of transistor 116 is connected to a voltage divider including a pair of serially connected resistors 141, 142. A capacitor 143 is connected from a point intermediate resistors 141, 142 to a point intermediate a resistor 145 and the collector of transistor 114. Resistor 145 connects the emitter of transistor 116 to battery terminal 33. The emitter of transistor 114 and the collector of transistor 116 are connected through a capacitor 146 to primary winding 147 of an output transformer 148. A resistor 149 connects the emitter electrode of transistor 116 to terminal 81. The secondary winding 150 of transformer 148 has one terminal connected to the battery terminal 81 and another terminal connected through a rectifier 152 and a capacitor 154 to time-out device 22.

Figure 3:
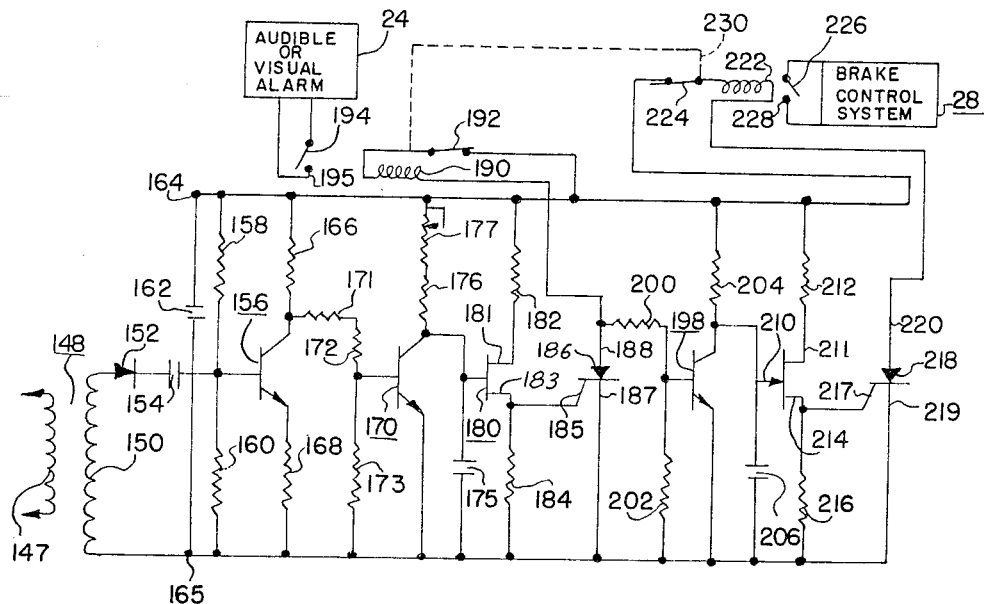
FIG. 3 is a combined block and schematic diagram of one illustrative time-out means and the alarm and brake control system which may be employed in combination with the embodiment of FIG. 1.

FIG. 3 is a combined schematic and block diagram of a two stage time-out device 22 and the circuits operated by the time-out device 22 in accordance with one illustrative embodiment of this invention. In FIG. 3, the rectifier 152 connected to the secondary winding 150 of the transformer 148 feeds Doppler signals through a capacitor 154 to the base of a transistor 156, forming part of the first stage, which base is also connected to a voltage divider including a pair of serially connected resistors 158, 160. A battery 162, or other suitable source of supply of direct current potential having a positive terminal 164 and a negative terminal 165, is connected across the voltage divider resistors 158, 160 and energizes the solid state devices employed in the time-out device 22. The collector of transistor 156 is connected to battery terminal 164 through a resistor 166. The emitter of transistor 156 is connected to battery terminal 165 through a resistor 168. The collector of transistor 156 is connected to the base of a transistor 170 through a pair of serially connected resistors 171, 172. The base of transistor 170 is connected to battery terminal 165 through a resistor 173.

A capacitor 175 is connected between the collector and emitter of transistor 170 and the capacitor is also connected to battery terminal 164 through a fixed resistor 176 and a variable resistor 177. The charging circuit of the capacitor 175 includes resistors 176, 177 and because the resistor 177 is a variable, the charging time, or the charging rate of the capacitor 175, can be varied by manually varying the resistor 177. Capacitor 175 and its charging circuit determine the predetermined period for the first time-out stage. The collector of transistor 170 is connected to the emitter of a unijunction transistor 180. The base 181 of transistor 180 is connected through a resistor 182 to battery terminal 164. The other base 183 of transistor 180 is connected through resistor 184 to battery terminal 165. The base 183 is connected to a gate 185 of a silicon controlled rectifier 186. The cathode, or base, 187 of the silicon controlled rectifier 186 is connected to negative battery terminal 165. The anode 188 of silicon controlled rectifier 186 is connected through a solenoid coil 190 and a normally closed switch 192 to the positive battery terminal 164. Operatively associated with the coil 190 is a normally open spring biased armature 194 and an operatively associated contact 195. The armature 194 and contact 195 are connected in the energizing circuit of the alarm 24 described in conjunction with FIG. 1. When the silicon controlled rectifier 186 is gated, actuated, or rendered conducting, the current through the silicon rectifier passes through the solenoid coil 190 and the coil attracts its armature 194 into engagement with contact 195 thus actuating the alarm 24.

The actuation of the first stage of the time-out device will now be described. When a Doppler signal is received, mixed and detected by the receiver 18, the Doppler signal is delivered through the secondary winding 150 of the transformer 148, is rectified by the rectifier 152 and fed through the capacitor 154 to the base of the transistor 156. Transistor 156 acts as an amplifier and transmits this amplified Doppler signal through its collector circuit including resistors 171, 172 to the base of transistor 170. Transistor 170 is normally non-conducting and is gated, i.e., rendered conducting by this amplified signal from transistor 156. When transistor 170 conducts, it acts as a capacitor discharging short circuit for capacitor 175. After the Doppler signal actuates transistor 170 short circuiting capacitor 175, transistor 170 again becomes non-conducting and capacitor 175 starts to charge through resistors 176, 177.

If no subsequent Doppler signal is received before the charge on capacitor 175 reaches a potential sufficient to render unijunction transistor 180 conducting, transistor 180 conducts and delivers through its base 183, a gating or firing signal to the gate 185 of silicon controlled rectifier 186. When silicon controlled rectifier 186 conducts the current flow through this rectifier and its associated solenoid coil 190 actuates the alarm 24. Because of the characteristics of silicon controlled rectifiers, the rectifier 186, when fired, continues to conduct until its anode-cathode path is opened by opening the normally closed switch 192. thus, alarm 24 will remain actuated until the first time-out stage is reset by opening the switch 192. It is understood that the manual operation of switch 192 will require sufficient motion to produce a Doppler signal, resetting capacitor 175. Because the charging rate of the capacitor 175 determines the period between the last Doppler signal and the actuation of the alarm, the variable resistor 177 constitutes means for varying the predetermined time interval during which sufficient motion must take place to produce a Doppler signal in the system.

The second time-out stage is preferably a fixed time interval network including a transistor 198 having its base connected through a resistor 200 and to the anode 188 of the silicon controlled rectifier 186. The base of transistor 198 is also connected to negative battery terminal 165 through a resistor 202. Because of the base-bias on transistor 198 established through resistors 200, 202 and coil 190, transistor 198 is normally conducting. The collector of transistor 198 is connected through a resistor 204 to the positive battery terminal 164. The collector is also connected to a capacitor 206 the opposite terminal of which is connected to negative battery terminal 165.

The cooperation of the second stage timing capacitor 206 and its charging rate controlling resistor 204 is substantially identical to the cooperation of capacitor 175 and its charging circuit resistors 176, 177. Capacitor 206 is normally short circuited by normally conducting transistor 198. Transistor 198 is rendered non-conducting by the actuation of silicon controlled rectifier 186, permitting capacitor 206 to begin charging. Thus, the second timing stage begins to time. In other words, the second stage timing capacitor 206 begin to charge through resistor 204 only after silicon controlled rectifier 186 has fired.

If the operator opens the push-button switch 192 to reset the silicon controlled rectifier 186, this operation also opens the base circuit of, and therefore deenergizes, transistor 198. When switch 192 is reclosed, the transistor 198 is again rendered conducting, maintaining a short circuit across the capacitor 206. The collector of transistor 198 is also connected to the emitter of unijunction transistor 210. Transistor 210 has a first base 211 connected to positive battery terminal 164 through a resistor 212. The unijunction transistor 210 has a second base 214 connected to the positive battery terminal 165 through a resistor 216. The base 214 is also connected to a gate electrode 217 of a silicon controlled rectifier 218, the base, or cathode, 219 of which is connected to negative battery terminal 165. The anode 220 of rectifier 218 is connected to the positive battery terminal 164 through a serially connected solenoid coil 222 and a normally closed switch 224. The coil 222 is operatively associated with a spring-biased armature 226 and a stationary contact 228. The armature 226 and contact 228 are connected in the energizing circuit of a brake control circuit 28.

After the first time-out stage is actuated, i.e., after the silicon controlled rectifier 186 is fired, and if the time-out stage is not reset by the opening of the normally closed switch 192, the timing operation of the second stage begins. In this second stage, the capacitor 206 normally charges through the resistor 204 and charges at a much slower rate than the capacitor 175 because the resistor 204 is several times larger than the resistance of resistors 176, 177 in the charging circuit of capacitor 175. The firing of rectifier 186 effectively short circuits resistors 200, 202, turning off normally conducting transistor 198. Capacitor 175 now begins to charge. When the potential difference across capacitor 206 reaches a predetermined value, transistor 210 conducts and delivers a gating signal from its base 214 to the gate 217 of silicon controlled rectifier 218. The gating of silicon controlled rectifier 218 causes current to flow through the solenoid coil 222, thus closing the armature 226 with its associated contact 228 thereby actuating the brake control system 28. If, after actuation of alarm 24 by the operation of the first timing stage, the operator responds to the alarm and depresses the normally closed switch 192, the switch 192 will be opened and silicon controlled rectifier 186 will deenergize. When switch 192 recloses, forward bias is again applied to transistor 198 which conducts and maintains capacitor 206 short circuited until the first time-out stage including silicon controlled rectifier is actuated. The second timing stage can be reset by momentarily depressing the normally closed reset switch 224 which will cause deenergization of silicon controlled rectifier 218 and the release of armature 226 to thereby deactivate the brake control system 28. The normally closed switches 192 and 224 may be ganged together, or a single switch may be employed, to which both relay coils 190 and 222 are connected as indicated by dotted line 230 which would mean that the reset switch 192 performs a resetting function for both the first and second timing stages.

Those skilled in the art will appreciate that various changes and modifications can be made in the invention without departing from the spirit and scope thereof. The essential characteristics of the invention are defined in the appended claims.

What is claimed is:

1. In a system for detecting the absence of movement of an ultrasonic energy reflecting body within a predetermined period comprising:
    an ultrasonic transmitter for transmitting a beam of energy toward said body;
    an ultrasonic Doppler receiver including a transducer for receiving energy reflected from said body;
    alarm means for indicating the failure of said receiver to receive a Doppler signal from said body within said predetermined period; and
    resettable time-out means connected between said receiver and said alarm means and including means for actuating said alarm means when no Doppler signal is received within said predetermined period.

2. The system according to claim 1 wherein said alarm means includes a visual alarm means connected to said time-out means and wherein said time-out means includes means for energizing said visual alarm means a predetermined period after no Doppler signal is received.

3. The system according to claim 1 further comprising vehicle brake control means coupled to said time-out means to be actuated a second predetermined period after said alarm means and wherein said body is the body of the vehicle operator.

4. In a system for detecting the absence of movement of an ultrasonic energy reflecting member within a predetermined time interval comprising:
    an ultrasonic transmitter for transmitting a beam of energy toward said member;
    an ultrasonic Doppler receiver including a transducer positioned to receive energy reflected from said member;
    alarm means for indicating the failure of said receiver to receive a Doppler signal indicating movement of said member within said predetermined time interval; and
    resettable time-out means connected between said receiver and said alarm means, said time-out means resetting each time a Doppler signal is received, said time-out means including means for actuating said alarm means if no Doppler signal is received within said predetermined interval.

5. In a system for detecting the absence of movement of an ultrasonic reflecting body in an ultrasonic beam within a predetermined time interval comprising:
    an ultrasonic transmitter including generator means for generating an electrical signal in an ultrasonic range and a transducer coupled to said generator for transmitting a beam of ultrasonic energy;
    an ultrasonic Doppler receiver including a transducer positioned to receive reflected beam energy and a mixer coupled to said transducer and to said generator;
    alarm means for indicating the failure of said receiver to receive a Doppler signal within said predetermined time interval; and
    resettable time-out means coupled between said mixer and said alarm means and including means for actuating said alarm means when no Doppler signal is received within said predetermined time interval, said time-out means resetting each time a Doppler signal is received.

6. The combination according to claim 5 wherein said alarm means includes visual alarm means and wherein said time-out means includes means for actuating said visual alarm means, a predetermined interval after no Doppler signal is received.

7. The system according to claim 5 further comprising vehicle brake control means coupled to said time-out means to be actuated a second predetermined interval after said alarm means.

8. The system according to claim 7 wherein said alarm means includes visual alarm means coupled to said time-out means and wherein said time-out means includes means for actuating said visual alarm means at a predetermined period after no Doppler signal is received.

9. The system according to claim 7 wherein said time-out means includes manual resetting means for preventing operation of said alarm means within said second predetermined interval after actuation of said alarm means.

10. In an ultrasonic device for detecting non-movement of an ultrasonic energy reflecting member, the combination comprising:
    an ultrasonic transmitter;

a receiving ultrasonic transducer;

mixer means coupled to said transducer;

a first timing stage coupled to said mixer means to be actuated by the failure of a Doppler signal to arrive at said receiver within a predetermined period and including, a capacitor, charging means for said capacitor, gate means coupled to said capacitor, and alarm means coupled to said gate means;

a second timing stage coupled to said first stage including second stage gate means coupled to said first stage gate means to be actuated thereby, said second stage gate means including, a normally conducting semi-conductor coupled to said first stage gate means, a second stage timing capacitor normally short circuited by said semi-conductor, means for charging said second stage capacitor, and a control network coupled to said second stage capacitor and actuated when the voltage across said second stage capacitor reaches a predetermined level.

11. The device according to claim 10 including switch means for resetting said first stage.

12. The device according to claim 10 including switch means for resetting said first and said second timing stages.

No references cited.

CHESTER L. JUSTUS, *Primary Examiner.*

R. A. FARLEY, *Assistant Examiner.*